United States Patent
Chainer et al.

(10) Patent No.: US 6,735,031 B2
(45) Date of Patent: May 11, 2004

(54) METHOD FOR STORAGE OF SELF-SERVOWRITING TIMING INFORMATION

(75) Inventors: Timothy J. Chainer, Putnam Valley, NY (US); Mark D. Schultz, Elmsford, NY (US); Bucknell C. Webb, Ossining, NY (US); Edward J. Yarmchuk, Mahopac, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 367 days.

(21) Appl. No.: 09/774,914

(22) Filed: Jan. 31, 2001

(65) Prior Publication Data

US 2002/0101672 A1 Aug. 1, 2002

(51) Int. Cl.$^7$ .............................. G11B 5/02; G11B 5/596
(52) U.S. Cl. .................. 360/51; 360/77.08; 360/78.14; 360/77.05; 360/53; 360/75; 360/48
(58) Field of Search .......................... 360/75, 51, 48, 360/77.08, 78.14, 77.02, 31, 77.05, 77.07, 53

(56) References Cited

U.S. PATENT DOCUMENTS

| | | | |
|---|---|---|---|
| 5,448,429 A | * | 9/1995 | Cribbs et al. .................. 360/75 |
| 5,485,322 A | | 1/1996 | Chainer et al. |
| 5,581,420 A | | 12/1996 | Chainer et al. |
| 5,612,833 A | | 3/1997 | Yarmchuk et al. |
| 5,615,058 A | * | 3/1997 | Chainer et al. ................ 360/51 |
| 5,648,720 A | | 7/1997 | Yarmchuk |
| 5,659,436 A | | 8/1997 | Yarmchuk et al. |
| 5,668,679 A | * | 9/1997 | Swearingen et al. .......... 360/75 |
| 5,757,574 A | | 5/1998 | Chainer et al. |
| 5,793,554 A | | 8/1998 | Chainer et al. |
| 5,844,742 A | | 12/1998 | Yarmchuk et al. |
| 5,875,064 A | | 2/1999 | Chainer et al. |
| 5,901,003 A | | 5/1999 | Chainer et al. |
| 5,907,447 A | | 5/1999 | Yarmchuk et al. |
| 5,991,115 A | | 11/1999 | Chainer et al. |
| 6,005,738 A | | 12/1999 | Chainer et al. |
| 6,031,680 A | | 2/2000 | Chainer et al. |
| 6,075,668 A | | 6/2000 | Chainer et al. |
| 6,078,450 A | | 6/2000 | Chainer et al. |
| 6,101,055 A | | 8/2000 | Chainer et al. |
| 6,101,063 A | | 8/2000 | Chainer et al. |
| 6,429,989 B1 | * | 8/2002 | Schultz et al. ................. 360/51 |

FOREIGN PATENT DOCUMENTS

EP          721184 A2 *   7/1996   ............ G11B/21/08

* cited by examiner

Primary Examiner—David Hudspeth
Assistant Examiner—Natalia Figueroa
(74) Attorney, Agent, or Firm—Jose Gutman; Fleit, Kain, Gibbons, Gutman, Bongini & Bianco P.L.

(57) ABSTRACT

A method for writing timing marks on a rotatable storage medium, such as on a disk in a disk drive, includes the steps of: 1) during a rotation of the disk, detecting the passage of at least a portion of a first timing mark located at a first radius of the disk, and 2) writing a second timing mark at a second radius of the disk, the location of the second timing mark being based at least in part on a stored calculation of a delay from the time of passage of the first timing mark during a rotation of the rotatable storage medium. The location of the second timing mark is calculated based on alternative time intervals between detected timing marks and on various functions of the time intervals.

33 Claims, 11 Drawing Sheets

METHOD FOR STORAGE OF SELF-SERVOWRITING TIMING INFORMATION

BACKGROUND OF THE INVENTION

1. Field of the Invention

This invention generally relates to the field of rotating media mass storage devices, and in particular relates to recording servodata timing information on hard disk drives for non-overlapping read and write heads.

2. Description of Related Art

High track densities in rotating media mass storage devices are becoming possible with newer drive technologies in voice-coil and other types of servo positioners as well as the ability to read and write narrower tracks by using, for example, magnetoresistive (MR) head technology. When track densities are very great mechanical error of a lead screw-stepper motor combination becomes significant compared to track-to-track spacing, and an embedded servo helps determine the position of the head from the signals it reads.

Conventional disk drive manufacturing techniques, for example, include writing servotracks on the media of a head disk assembly (HDA) with a specialized servowriter instrument. Laser positioning feedback is used in such instruments to read the actual physical position of a recording head used to write the servotracks. Unfortunately, it is becoming more and more difficult for such servowriters to invade the internal environment of a HDA for servowriting because the HDAs themselves are exceedingly small and depend on their covers and castings to be in place for proper operation. Some HDAs are the size and thickness of a plastic credit card. At such levels of microminiaturization, traditional servowriting methods are inadequate.

Conventional servo-patterns typically comprise short bursts of a constant frequency signal, very precisely located offset from a data track's center line, on either side. The bursts are written in a sector header area, and can be used to find the center line of a track. Staying on center is required during both reading and writing. Since there can be sixty or more sectors per track, that same number of servo data areas must be dispersed around a data track. Further, the servodata is generally dispersed around the data track by writing short bursts in each of the sixty or so sector header areas of the data track. Such data bursts can be used by the embedded servo mechanism to find the center line of the data track. This allows the head to follow the track center line around the disk even when the track is out of round (e.g., due to spindle wobble, disk slip, and/or thermal expansion). As the size of disk drives is reduced and track density is increased, the servodata must be more accurately located on the disk.

Servodata is conventionally written by dedicated, external servowriting equipment, and typically involves the use of large granite blocks to support the disk drive and quiet outside vibration effects. An auxiliary clock head is inserted onto the surface of the recording disk and is used to write a reference timing pattern. An external head/arm positioner with a very accurate lead screw and a laser displacement measurement device for positional feedback is used to precisely determine transducer location and is the basis for track placement and track-to-track spacing. The servo writer requires a clean room environment, as the disk and heads will be exposed to the environment to allow the access of the external head and actuator.

A conventional servodata pattern on a disk comprises circular data tracks that are broken into sectors. Each sector typically has a sector header area followed by a data area. Each sector header area includes sector header information followed by a servodata area that provides radial position information. The sector header information includes a servo-identification (SID) field and a gray code field that must be precisely aligned from track to track to prevent destructive interference in the magnetic pattern. Such interference can reduce the amplitude of the signal and cause data errors.

During conventional drive manufacturing, the disk drive is typically mounted in a mastering station that is known as a servowriter. The servowriter has sensors that are positioned outside of the disk drive to locate the radial and circumferential position of at least one of the drive's internal heads. Using information from the sensors, the servowriter causes the head to write a pattern, typically magnetic information, (i.e., servodata) onto the disk. As explained above, the servopattern becomes the master reference used by the disk drive during normal operation to locate the tracks and sectors for data storage. When such a station is used to perform the servo-writing, manufacturing expenses increase because each disk drive must be mounted in the servowriter. Additionally, the mechanical boundary conditions of the disk are altered because the external sensors must have access to the actuator and the disk spindle motor. Thus, mechanical clamping and disassembly of the drive may also be required.

According to another conventional servo-writing process, a master clock track is first written on the disk by a separate head to serve as a timing reference for the entire servo-track writing operation. After writing the master clock track, "even" servodata bursts are written over the entire surface of the disk by first moving the arm to the outer crash stop and then radially moving the arm a distance that is less than a data track width for each revolution of the disk.

After reaching the inner diameter of the disk, the arm is once again moved to the outer crash stop and then radially moved for each revolution of the disk to write "odd" servodata bursts. After servo-writing is completed, the number of steps of the arm from the outer crash stop to the inner crash stop is compared with the desired number of tracks. If the number of steps is different from the desired number of tracks, a bias is introduced and the process is repeated so that the number of steps will equal the desired number of tracks.

Such conventional servo-writing procedures require the use of an external timing sensor in order to write the timing patterns that are used to determine the circumferential head position. Because external sensors are needed, the servo-writing must be performed in a clean room environment. Additionally, an external clock source and auxiliary clock heads are required to write the timing information. Further, in such procedures, an entire disk of information must be written to determine the track pitch to use to write the servopattern. This takes times and leads to higher manufacturing costs.

To overcome such problems, self-servo-writing timing generation processes have recently been developed. These processes allow accurately aligned servodata tracks to be written sequentially at each servo data radius without using any mechanical, magnetic, or optical positioning systems to control the circumferential positioning of the servo data. Further, the need for auxiliary clock heads to write a reference timing pattern on the disk is eliminated.

According to one method, first timing marks are written at a first radial position of the storage medium. Timing marks are defined here to be data patterns from which an accurate time of passage can be determined. Timing marks can be the servo data itself or separate timing marks written only to assist in maintaining accurate circumferential positioning of the servodata during the servowrite process. Time intervals between selected pairs of the first timing marks are measured during revolutions of the disk. The head is moved to a second radial position. Next, additional timing marks are written by recording the time of passage of every other timing mark (say the odd numbered ones) during revolutions of the disk and then writing the intervening time marks (the even numbered ones) at calculated delays thereafter. Time intervals between selected pairs of the first timing marks are measured during revolutions of the disk. Then the head is moved to a second radial position.

Next, additional timing marks are written by recording the time of passage of every other timing marks at the circumferential positions just written (here the even numbered ones) during revolutions of the disk and then writing the intervening time marks (the odd numbered ones) at calculated delays thereafter. In the preferred method, servo data is written on one or more disk surfaces in the intervals between the timing marks. In a preferred method, the steps of measuring, moving, and writing other timing marks are repeated until the servopattern is written on an entire surface of the storage medium.

According to another method, first timing marks are written at a first radial position of the storage medium. Time intervals between selected pairs of the first timing marks are measured. The head is moved to a second radial position. Next, additional timing marks are written by recording the time of passage of every other timing mark (say the odd numbered ones) during revolutions of the disk and then writing the intervening time marks (the even numbered ones) at calculated delays thereafter. The time intervals between the newly written (even) marks are estimated to be the difference in times of passage of the adjacent timing (odd) marks plus the difference in the delay before writing the new timing marks. Then the head is moved to a second radial position. Next, additional timing marks are written by recording the time of passage of every other timing marks at the circumferential positions just written (here the even numbered ones) during revolutions of the disk and then writing the intervening time marks (the odd numbered ones) at calculated delays thereafter.

The time intervals between the newly written (odd) marks are estimated to be the difference in times of passage of the adjacent timing (even) marks plus the difference in the delay before writing the new timing marks. In the preferred method, servo data is written on one or more disk surfaces in the intervals between the timing marks. In a preferred method, the steps of measuring, moving, and writing other timing marks are repeated until the servopattern is written on an entire surface of the storage medium.

While such self-servo-writing processes are sufficient when the servodata tracks are to be written using overlapping read and write heads (i.e., where a track can be written and read without changing head position), disk drives with non-overlapping read and write elements are now being produced. More specifically, as read and write element dimensions have been decreased to increase storage density, the widths over which reading and writing occur have decreased more rapidly than the distance between the read and write elements themselves. As a result, when using a head with such elements on a rotary actuator, the read element of the head can no longer overlap the area written by the write element of the head at all radial positions. When the above self-servo-writing processes are used for drives in which the read and write elements do not overlap, accurate circumferential alignment of the servodata tracks is not maintained and there is a lack of stability against the growth of random errors in the pattern generation process.

According to another method, first timing marks are written at a first radial position of the storage medium during revolutions of the disk. Then the head is moved to a second radial position. Time intervals between selected pairs of the first timing marks are measured during revolutions of the disk. Next, additional timing marks are written by recording the time of passage of every other timing mark (say the odd numbered ones) during revolutions of the disk and then writing the intervening time marks (the even numbered ones) at calculated delays thereafter. Then the head is moved to a second radial position. Time intervals between selected pairs of the first timing marks are measured during revolutions of the disk. Next, additional timing marks are written by recording the time of passage of every other timing marks at the circumferential positions just written (here the even numbered ones) during revolutions of the disk and then writing the intervening time marks (the odd numbered ones) at calculated delays thereafter. In a preferred method, the steps of moving, measuring, and writing other timing marks are repeated until the servopattern is written on an entire surface of the storage medium.

In this self-servo-writing process the placement of new timing marks normally has occurred at least every other revolution to allow reading of, and measuring all the time intervals between, existing timing marks at least during a revolution before writing a subsequent new timing mark. In addition, with all of these processes only half of the timing mark locations are written at each radial position. This, unfortunately, can result in odd-even sector asymmetry, reduced signal strength at the timing mark, and increases the overall time between measurements during which the motor speed can significantly vary possibly introducing additional timing errors into measurements of timing mark locations.

Therefore a need exists to overcome the problems with the prior art as discussed above, and particularly for a method to more effectively write timing marks on rotatable storage media for writing servodata tracks thereon.

DESCRIPTION OF THE PREFERRED EMBODIMENTS

The present invention, according to a preferred method, overcomes problems with the prior art by detecting the passage of timing marks, calculating and storing timing information for writing timing marks at calculated locations, and then writing radial extensions to the timing marks at the calculated locations based on the stored information.

More specifically, the method calculates and stores the locations of written timing marks based on the measured and calculated locations of prior timing marks and the time of writing of the newly written marks compared to the time of passage of detectable timing marks. These stored locations are used to calculate new delays between detected timing marks and the writing of additional timing marks. The delays calculated from the stored locations may be applied to write new timing marks immediately at the current or next radial location or at two or more radial locations away from the current head position and, instead of at the current or neighboring radial location, after the head has been repositioned and used to write timing marks at a plurality of radial locations, depending on the head offset.

The new method, according to a preferred embodiment of the present invention, is applicable to cases where the read and write elements are offset radially. The method is able to maintain circumferential alignment for offset heads, such that when positioned to write servodata at a given radial location the read head passes over previously written servodata as the disk rotates. Since servodata is sequentially written at each radial position on the disk, this condition is preferably fulfilled with the read head being displaced from the write head opposite to the direction of servowriting propagation.

Definitions and parameters

Figure 7:
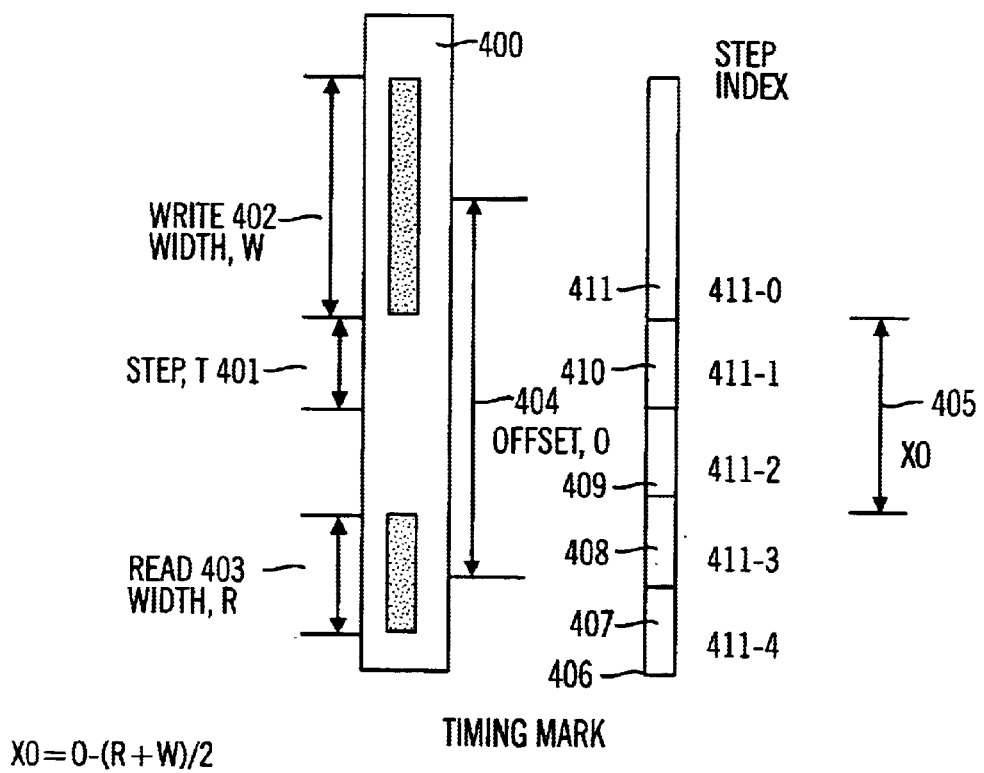

As explained above, disk drives are now being manufactured with non-overlapping read and write elements. The self-propagation processes of the present invention provides timing control for writing servo-track information for such drives in which the radial position of the write element may not overlap the radial position of the read element for at least some radial position of the actuator arm. In other words, data written by the write element cannot be detected by the read element without changing the radial location of the head. The present invention solves the problem of propagating timing patterns with disk drives employing "offset" heads (i.e., read and write elements are physically separated in the radial direction). FIG. 7 shows an exemplary offset head 400 in which the recording or writing element 402 and the magnetic detection or read element 403 are physically separated in the radial (vertical axis in the figure) direction. In this example, five written tracks, 407, 408, 409, 410 and 411, are illustrated in the range of the offset head 400. As shown in FIG. 7, the write element is positioned radially and has written a timing mark at location 411, which overlaps a portion of the timing mark 410 located at the adjacent track location which was written on a previous revolution of the disk.

As further shown in FIG. 7, a line of timing marks was created by repeating the pattern of writing timing patterns which overlap the previously written adjacent pattern. The process began writing trigger pattern 407, next writing trigger pattern 408, next writing trigger pattern 409, next writing trigger pattern 410 and finally writing trigger pattern 411. In each case the writing of a trigger pattern overlaps a portion of the previously written adjacent trigger pattern. In this process the timing marks form a line 406 and each newly written timing mark extends the length of the line. During servowriting the head is positioned successively so that the write head is positioned to write servo data at unit submultiples of the data track radial spacing. That is, the head movement can radially locate the head at fractional increments of the data track radial spacing. Timing marks may be written at these radial locations or at other unit submultiples of the data track spacing. Together these radial locations define the possible radial locations where timing marks may be written.

A timing mark extension is defined here to be a timing mark (also called a trigger pattern in prior art) written at least in part at the same circumferential location as, and coherently and aligned with, the data of, some portion of an existing timing mark at an adjacent radial location such that some part of the two timing marks can be read simultaneously by the read head at some radial position. A timing mark line is a set of timing marks written so as to be extensions of a timing mark. The goal is to maintain a precise alignment of the timing marks to provide exact indicators of the rotational position of the disk during the servowrite process. By coherent and aligned we mean that at each radius where a portion of two or more timing marks are read the circumferential misalignment of the pattern does not degrade the amplitude of the read back signal to the point that the pattern can no longer be detected.

Each time a timing mark line is extended, some of a timing mark previously written may be overwritten as shown, here the timing mark line 406 began as the part labeled 407 which was extended during different disk rotations by the timing mark 408, 409, 410, 411. When part of the timing mark is overwritten, the label for that part is applied to the part that is not overwritten. Each of these parts of the timing mark will be called timing mark components.

In FIG. 7, the read head 403 is positioned radially so that, as the disk rotates, the read head will pass over the timing marks within a timing mark line 406 labeled 407 and 408. Approximately, the portion of the timing mark line that passes under the read head will contribute to the read back signal from the head. That part of a timing mark line that contributes to the read back signal will be called the detected timing mark. As shown the detected timing mark is made up of a part of 407 and a part of 408, which will be called the detected components of the timing mark.

It is convenient to talk about the location of a timing mark; but since a timing mark is located on a rotating medium we will define the location of a timing mark in terms of it's radial position, and it's circumferential location that is defined by the time interval between successive timing marks. The time interval between the passage of the timing mark indexed by i and it's immediate predecessor in the rotation will be defined as I[i]. The location will be indexed by the timing mark index i, from 0 to n−1, enumerating the successive timing marks during a disk rotation counting from some arbitrary fixed circumferential position such as the motor index location. The stored radial location of a timing mark will be also indicated by the index of the radial step where it was written, S. Thus the notation for the location of a timing mark will be L[S,i], where S is the radial location, and "i" indicates the circumferential location. We will use the index S only with the array of stored locations L[S,i], all other arrays will represent most recent values of parameters and will be indexed only by the sector number "i". For instance: the notation for an interval will be given by I[i] which when equal to L[S,i+1]−L[S,i] is the time interval between the circumferential locations as the disk rotates under the read-write head, of the timing mark written at radial step S and timing mark index "i" and the timing mark written at radial step S and timing mark index "i+1". The numerical definition of the parameter I[i] will depend on where it is used but will in each case represent a time interval between sucessive timing marks. The detected timing mark time interval, IM[i+1] is defined to be the measured time interval between the time passage of the detected timing mark at index "i+1" and the previous timing mark with index "i" at the current radial position. As each detected timing mark passes, new timing marks extending the existing timing mark lines are written at precalculated delays thereafter. These delays will be called write delays. A purpose of the current invention is to relate the actual current locations LC[i] and the actual current time intervals [i] to the stored data L[S,i] so that an estimate of the intervals I[i] can be used in place of an actual measurement of the detected intervals IM[i] wherever the measured intervals are used to calculate the write delays, D[i]. The index "i" again indicates that the delay is used to write the "i"th timing mark during the disk rotation.

Advantage of Estimating Detected Intervals to Stored Data

After a read operation occurs a calculated write delay is used for the subsequent write operation. Storing timing interval estimates when timing marks are originally written until the read head is positioned so that the timing marks are detected allows write delays to be calculated based at least in part on the stored timing information. By using this stored timing information the method, according to the preferred embodiment of the present invention, saves the measurement time that has been necessary in prior art implementations. That is, it eliminates the need to use a second disk rotation to measure the locations of detectable timing marks, thereby improving overall process speed.

Additionally, for calculating timing propagations a system controller needs to know the time intervals between detected timing marks so that correction terms can be calculated from these intervals during or before a revolution where writes will take place to extend the timing marks. Prior art methods have provided this knowledge of the time intervals in one of two ways: either by measuring the intervals between detected timing marks at a radial position, which requires additional process time of at least one revolution of the disk; or for the special case where the offset between the read head and the write head is small enough that the read head can detect the most recently written timing marks when positioned radially to write the timing mark at the next adjacent radial location of the head, use the intervals between the sequential times of passage of timing marks and the times of writing of the most recent timing marks. (See, for example, U.S. patent application Ser. Nos. 09/550,643, 08/882,396, 09/316,884, 09/316,882, and 08/891,122, which are all commonly owned by the assignee of the present patent application and the entire teachings of which are hereby incorporated by reference.)

The previous methods of servowriting when applied to the case where the read and write elements are radially offset determine the intervals between timing marks by measuring the intervals between timing marks during a measurement revolution separate from the revolution where writing takes place. A preferred embodiment of the present invention replaces the measurements with estimates of the intervals from stored information obtained during revolutions where writing takes place with a resulting decrease in process time. The preferred embodiments according to the present invention are applicable to disk drives with heads of arbitrary read-to-write radial head offset.

Determination of Head Offset Parameters

As the head is stepped to each new radial location, stored estimates of previously recorded timing marks are retrieved to be used to calculate the delays for writing new timing marks. To do this we first determine the index indicating the number of radial propagation steps between the trigger patterns being read and the trigger patterns being written. In FIG. 7, we can see the timing mark line 406 consists of section 411 which is being currently written, labeled with index 411-0, which has extended and partly overwritten the timing mark written one step back 410, labeled with index 411-1 which extended a part written 2 steps back labeled with index 411-2. Thus if timing marks now being written will be stored with index S which has been incremented with each step, the timing marks detected by the read head are associated with the indexes S-N1 and S-N2, where the read head spans a seam between timing marks written N1 and N2 radial propagation steps prior. In the case where the head spans such a seam we can indicate timing mark component, the fractional amount of the read head that lies over the part of the timing mark line written N1 steps previous by F1, and fractional amount F2 indicating for N2 steps previous. In the example shown in FIG. 7, the write width, w,402, the read to write offset o, 404, the read width r,403 of the head 400 and the servo radial step distance t, 401 are such that the read head spans the seam between the parts of a timing mark line 406 that were written 3 and 4 steps previously.

There are a number of methods that can be used to determine read to write radial offset during the detection of trigger patterns at step S in the propagation of timing patterns. They are:

1) Measuring where the read head is relative to the write head at two or more radial points and interpolating.
2) Measuring the read and write widths and the radial head read to write head offset at two or more radial points and interpolating.
3) Measuring the signal amplitude of one or more amplitude bursts at one or more radial locations.
4) Measuring the write width, the radial read to write head offset and read to write circumferential distance either in the file or prior to assembly.

Preferred Method for Determining the N1, N2 and F1 and F2

In a preferred embodiment, the write width, read width, and offset as a function of radial position are known and the read head width is less than or approximately equal to the servo track pitch. Then the above parameters can be calculated by defining the parameter X0, 405 which is $$X0=o-(r+w)/2$$

Then $$N1=Int[X0/t]+1, \text{ where Int is the integer part of the fraction x0/t,}$$

and $$F1=MIN(t/r*(N1-X0), 1) \text{ where MIN function is the minimum of the two parameters.}$$

And $$N2=N1+1$$

and $$F2=1-F1.$$

The above formulas hold if the r<=t so that the read head at most spans components of a timing mark line written at two successive radial positions. In the case where r<t, the parameter F2 may be zero for some offsets.

In the case where r>t we need to determine how many timing mark components the data head is reading; if r>t the read head can span three tracks or more. In this case the following rule should be applied: Is F2>t/r? If so, the head spans 3 or more tracks. If so, set F2=t/r and define N3=N2+1 and F3=1−F2−F1. N3 and F3 are the index of the third overlapped timing mark and the fraction of the signal from that mark. The same test can be performed on F3, (F3>t/r?)—If so, the head spans 4 or more tracks and N4 and F4 are defined iteratively. In each case, the respective F2, F3 . . . represent the fraction of the read head passing over a particular component of the detectable timing mark which was written N2, N3 . . . radial steps previously.

An alternative preferred embodiment for the storage of data for three tracks will now be described. For simplicity, if the head is wide enough to span three tracks we may still want to use only the stored data for the two principal components. Instead of defining additional indexes, test if 2*F1<1−t/r, if not keep the original definitions of F1 and F2. If the test is true then more of the signal is coming from the timing mark written at N2+1 than from N1. There are then two choices, use the calculated values anyway, or use F2=1−F1−t/r, N1=N2, F1=1−F2, and N2=N2+1, calculated in the order listed. In each case, the portion of the signal from the overlapped timing mark line being ignored is added to the nearer used timing mark.

In an alternative embodiment, the read width and servo track widths are comparable and t/r is approximated by 1, which removes one parameter from all of the above formulae and eliminates the need to determine the read width.

Alternative Methods for Determining the N1, N2 and F1 and F2

In a first alternative embodiment the parameters r, w, o are known at two or more radial locations and are approximated by a linear or smooth curve fit in-between.

Figure 11:
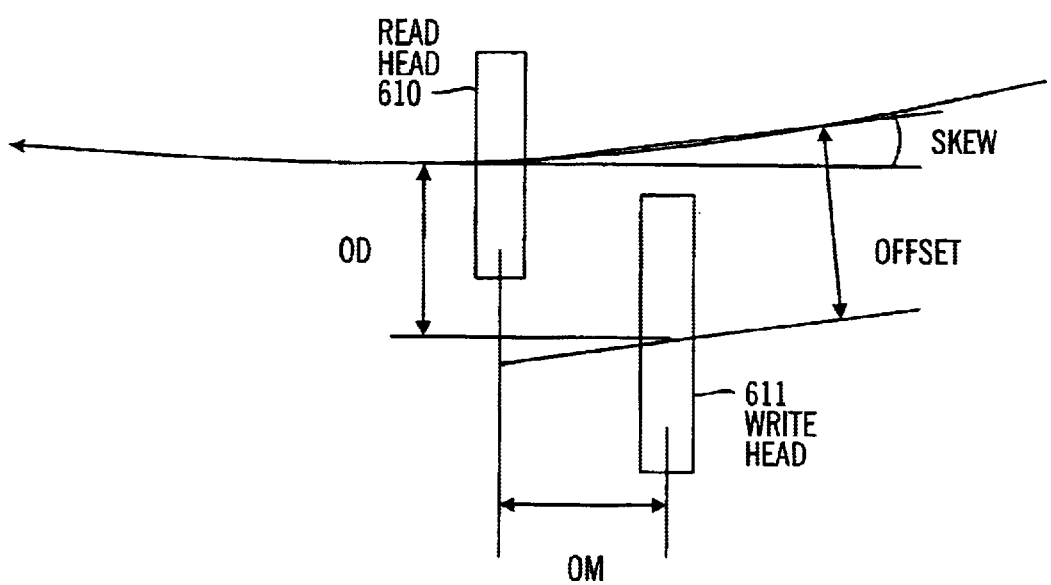

In a second alternative embodiment, the parameters r, w and read-write manufacturing offsets OM measuring the lateral offset between the read head 610 and write head 611 in the gap plane and OD the offset between read and write in the perpendicular to the gap plane and the head skew angle are known. See FIG. 11. The parameter o can then be calculated via: o=OD*cos(skew)+OM*sin(skew).

Figure 9:
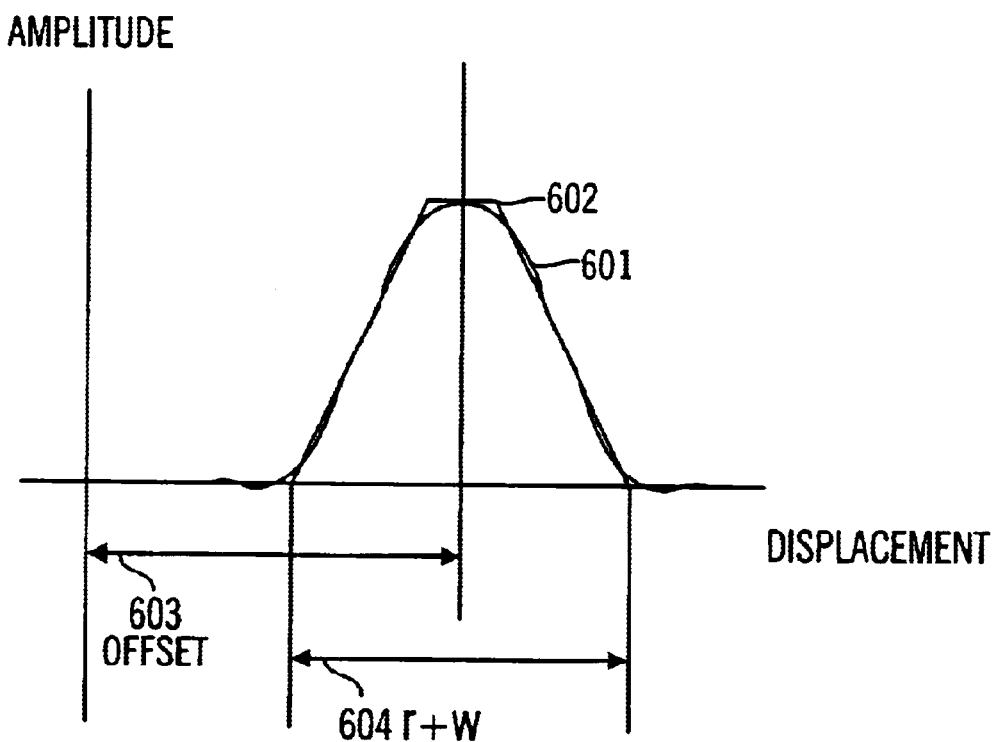
FIG. 9 is a graph diagram illustrating signal amplitude vs. displacement plot in accordance with a preferred embodiment of the present invention.

In a third alternative embodiment, the off-track profile, the signal strength of an amplitude burst versus radial offset 603 from the write location is measured at one or more radial locations 604 and the parameters are determined from a trapezoidal approximation 602 to the off-track profile 601 as shown in FIG. 9. The parameter values are extended to other radii by interpolation.

Figure 10:
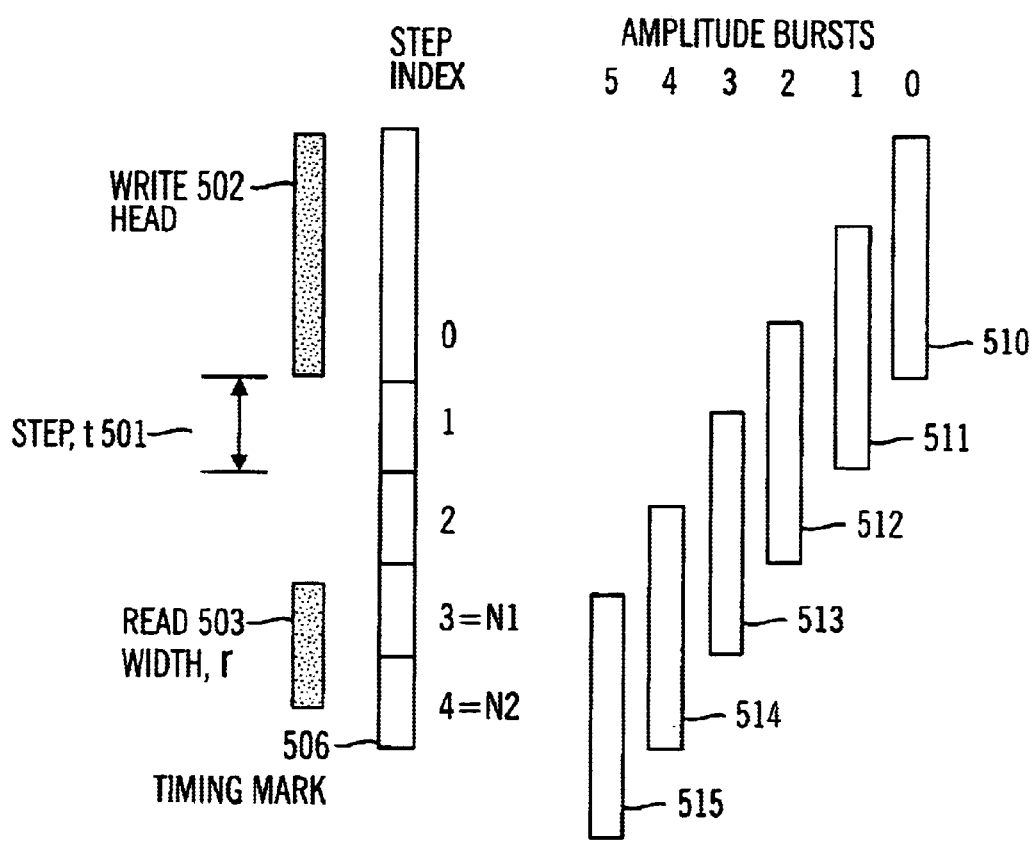
FIGS. 10 and 11 are exemplary top planar views of portions of a disk and exemplary offset read-write element heads being shown moving over the disk including timing marks, according to the preferred embodiments of the present invention.

In a fourth alternative embodiment, one or more amplitude bursts (510, 511, 512, 513, 514, and 515) are written by the write head 602 at the servo step 501 radial locations prior to or during the servo propagation as shown in FIG. 10. As seen in the figure, at N2 506 steps back the read head 503 falls entirely onto an amplitude burst 515, producing a signal level of 100% of the maximum value. In turn, N1 is the next step closer to the radial location, the first which does not exhibit the maximum amplitude. The parameter F1 is the ratio of the amplitude measured at N1 515 to that measured at N2 506, and F2=1−F1.

In a fifth alternative embodiment, only a single amplitude burst is written and it's amplitude is monitored as the head is stepped radially, to determine the first step offset with 100% or maximum amplitude, N2, and the step prior to N2, N1 and the fractions F1=amplitude(N1)/amplitude(N2), F2=1−F1.

Process Steps in Preferred Embodiment (DWWR)

According to a preferred embodiment of the present invention, a servo architecture is "embedded servo" in which a clock propagation process is used to write servo pattern information on disk surfaces of the disk drive. To write the servo pattern, a clock is utilized to position the servodata circumferentially. In a self-propagation process, only the data heads of the disk drive are used to generate the clock that is used to write the servo pattern.

A method, according to a preferred embodiment of the present invention, detects both the passage of timing marks and then writes radial extensions to all of those timing marks at substantially the same circumferential positions. This is possible, despite the inability of a disk drive or similar rotatable medium systems to write and read at the same time, when the read head is a separate element that encounters points on a rotating disk surface slightly before the write head element so that the detection of an existing timing mark line can take place before the writing of a new timing mark in substantially the same circumferential location.

Figure 1:
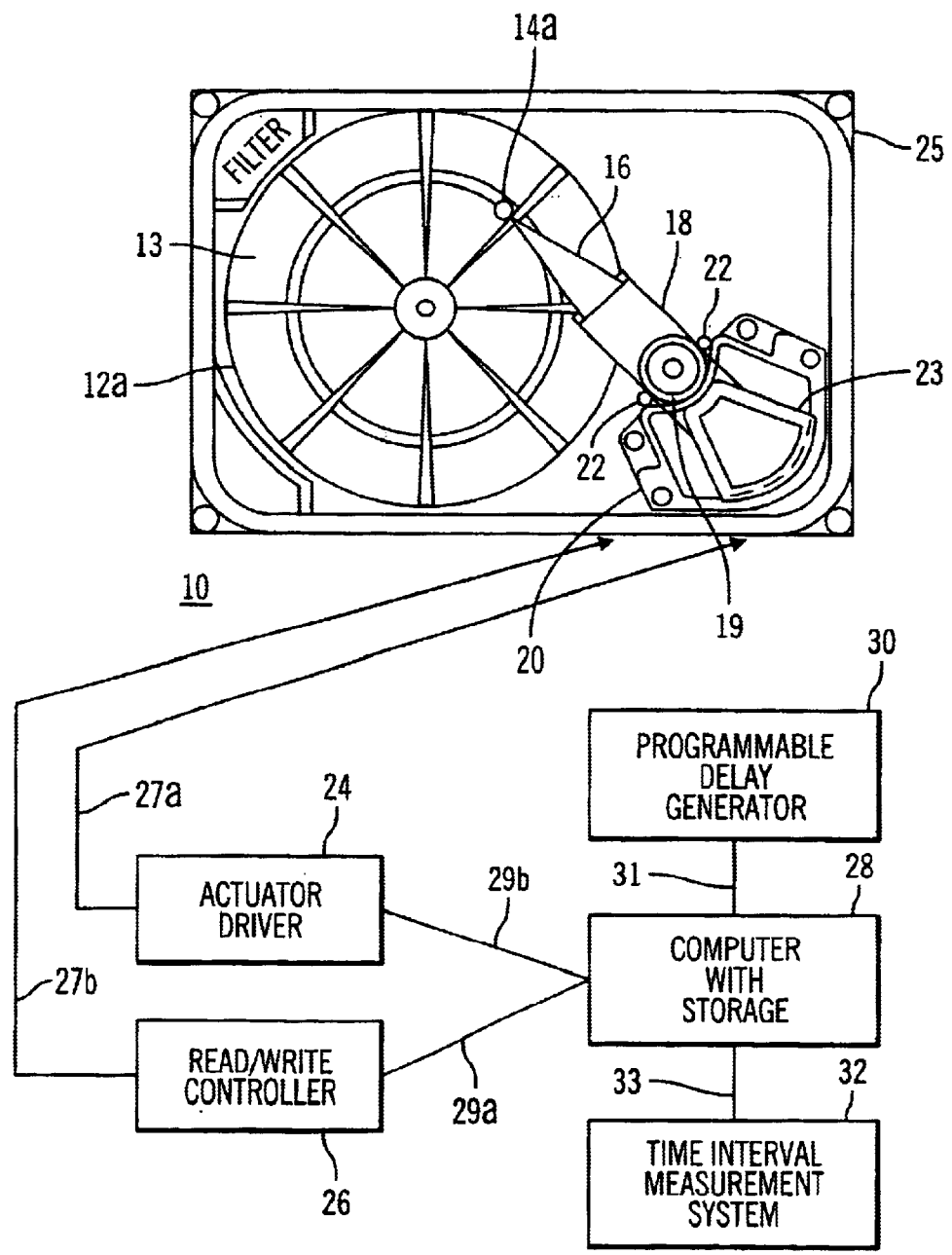
FIGS. 1, 2, and 3, illustrate an exemplary disk drive system and associated timing control and measurement apparatus for use with a self-servo-writing process according to the preferred embodiments of the present invention.
Figure 2:
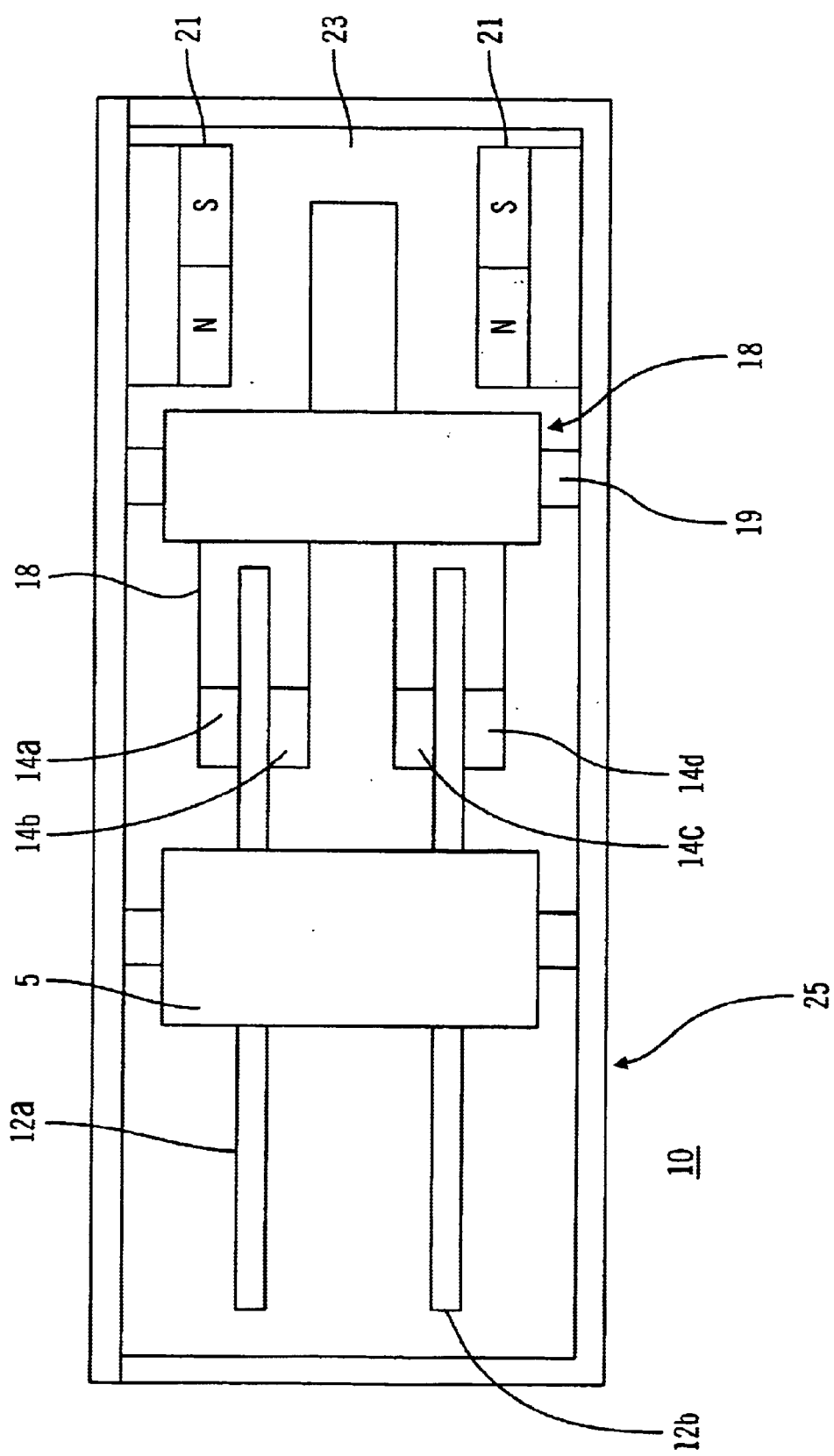
Figure 3:
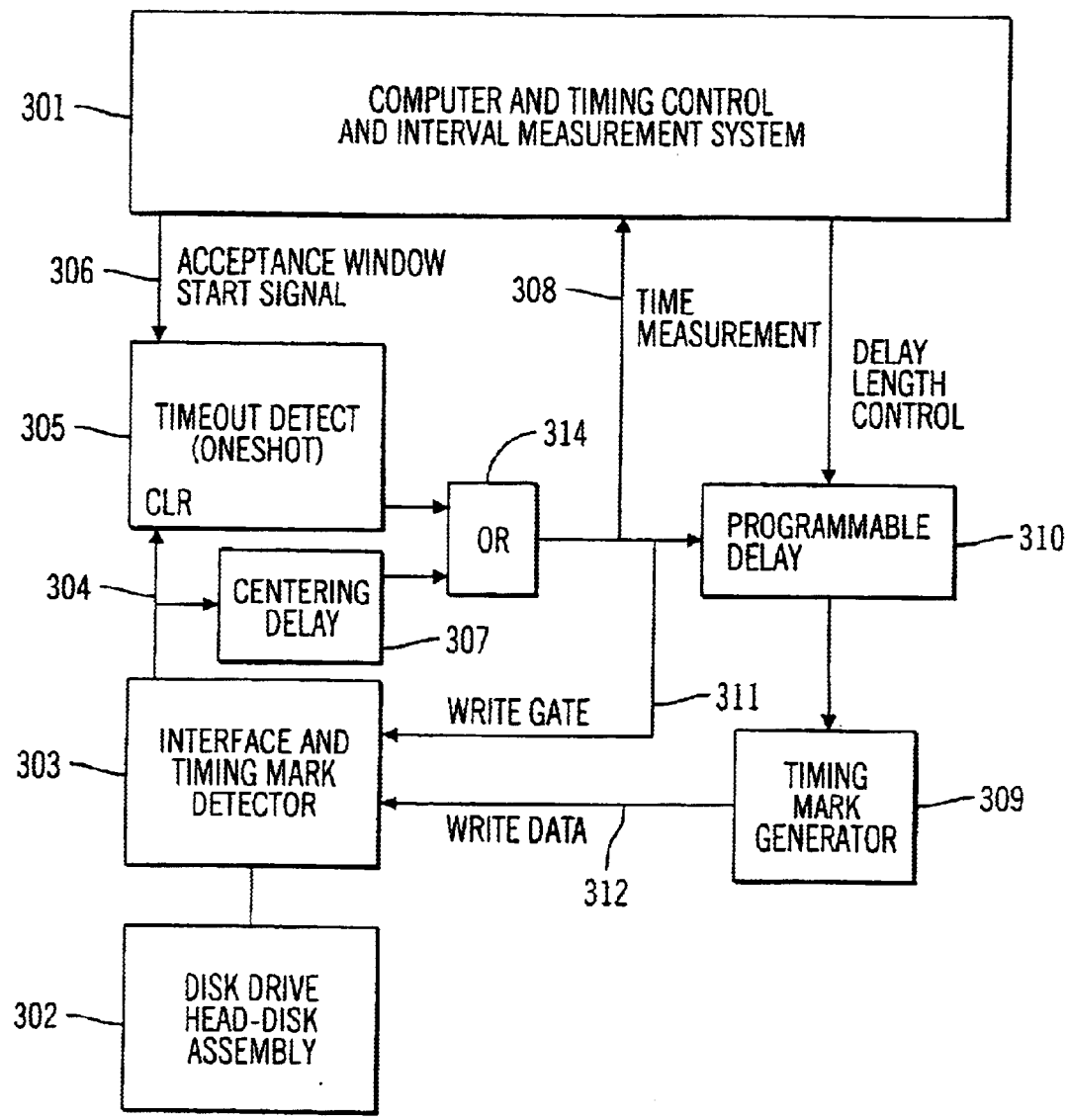

FIGS. 1, 2, and 3, illustrate an exemplary disk drive system according to a preferred embodiment of the present invention. The drive 10 includes magnetic disks 12, such as disks 12a and 12b as shown, internal recording heads 14, such as heads 14a, 14b, 14c, and 14d, as shown, head suspension mechanisms 16, an actuator 18, an actuator attachment 20, and crash stops 22. Also shown in FIG. 1 are an actuator driver 24 a read/write controller 26, a computer 28, a programmable delay generator 30, and a time interval measurement system 32. In the illustrated drive, each of the magnetic disks has two surfaces that can store information in circular tracks 13. The internal recording heads 14 are used to write information onto these surfaces, and a spindle motor 5 spins the magnetic disks 12. Each recording head 14 is attached to a suspension mechanism 16 that allows the head to move in a vertical direction.

The actuator 18 (e.g., a standard moving coil actuator that includes a ball bearing 19) connects the suspension mechanism 16 to a voice coil motor 23 that has magnets 21. The crash stops 22 are provided on the sides of the ball bearing 19 to limit the range of the actuator 18, which is mounted to a base plate 25 via the actuator attachment 20. The actuator driver 24 is coupled to the drive via a wire 27a to provide current to the voice coil motor 23. Additionally, the read/write controller 26 is coupled to the drive via another wire 27b to read and write information (i.e., magnetic transitions) on the magnetic disks 12.

The computer is coupled to the actuator driver 24 and the read/write controller 26 via buses 29a and 29b, and to the programmable delay generator 30 (e.g., a Hewlett Packard HP8118A) and the time interval measurement system 32 (e.g., including a Hewlett Packard HP5372A time analyzer) via buses 31 and 33 (e.g., IEEE busses). The programmable delay generator 30 controls the write timing and the time interval measurement system 32 measures selected time intervals. The use of such hardware to write servodata is further described in U.S. Pat. No. 5,615,058, the entire teachings of which are hereby incorporated by reference, The timing system, as discussed above, has an accurate clock which can be used to record the time of passage of each timing mark on a rotating medium, e.g., a disk, and can generate signals to the write head to write new extensions to the timing marks at precise intervals afterward. The delay intervals are calculated from previously measured or estimated intervals using methods as will be discussed below.

FIG. 3 illustrates an exemplary timing system 301 that brings an acceptance start line 306 high at a time following a previous detected timing mark which represents the earliest time that the detected timing mark can pass and not be rejected as a false trigger caused by noise. A timing window indicated by the one-shot 305 then goes until the last allowed time for the arrival of the detected timing mark, a time earlier than the time where a write must be performed. Timing marks are received from the disk drive 302 and are detected by the circuitry 303 to create a mark detect signal 304. The mark detect disables the downward transition of the accept window and triggers the detect delay 307. The detect delay is set equal to the difference between the expected arrival of the detected timing mark and the closing of the acceptance window. The end of the detect delay triggers the time measurement signal at the OR logic gate 314 going to the timing system 308 and the programmable write delay 310, which has been set by the timing system 301 to the necessary delay to align the write of the extension of the timing mark line with an existing timing mark. The end of the timing mark delay at the programmable write delay 310 signals the timing mark generator 309 which then generates the actual timing mark write 312. If the detected timing mark is missing or occurs so early that acceptance window is closed (low), the end of the acceptance window triggers the time measurement signal at the OR logic gate 314 going to the timing system 308 and the write delay 310. This time delay has been set by the timing system 301 to the necessary delay to align the write of the new timing mark with the existing timing mark line.

The write delay, according to a preferred embodiment of the present invention, is equal to the systematic delay plus correction terms. The systematic delay is measured in accordance with the teachings of U.S. patent application Ser. No. 09/550,643 and U.S. patent application Ser. No. 08/882,396 which are commonly owned by the assignee of the present patent application and the entire teachings of which are hereby incorporated by reference. This systematic delay can be computed by detecting the rotation of the marks relative to an external disk orientation reference and is due (in the current example) to the difference in the time of arrival of the write and read heads combined with electronic delays minus the detect delay. The random error correction terms are preferably calculated according to the teachings of U.S. Pat. No. 6,075,668, entitled "Method and apparatus for correcting for random errors in timing pattern generation", and U.S. Pat. No. 5,901,003 entitled "Method and apparatus for determining systematic errors", and U.S. patent application Ser. No. 09/316,884, and U.S. patent application Ser. No. 09/316,882, and which are all commonly owned by the assignee of the present patent application and the entire teachings of which are hereby incorporated by reference.

In the following section we will describe the calculating of estimated intervals between the detected timing marks before writing new timing marks. According to a preferred embodiment of the present invention, these estimated intervals replace the measured intervals between detected timing marks where ever they appear in the prior art, for instance in calculating the correction for random errors. As part of the correction method, the system shifts the new timing mark slightly to correct for errors in the position accumulated from previous steps in the process and are calculated from the estimates of intervals between previous timing marks. According to a preferred embodiment of the present invention, the delay for writing can be calculated as the sum of systematic, C and random error, R[i] corrections, where the random error correction is calculated for each timing mark index i:

$D[i]=C+R[i]$.

This exemplary embodiment of the present invention provides a method of writing a servopattern on a storage medium. We create, at step S10, an initial set of timing marks forming a timing mark line by a start up process by a method such as taught in U.S. patent application Ser. No. 09/426,435, the entire teachings of which are hereby incorporated by reference. Thereafter, process steps permit the writing of extensions to the timing mark line based at least in part on calculated delays after detected previously written timing marks, as will be discuss in detail below. According to the method, first timing marks are written at a first radial position of the storage medium, and the head is moved to second radial position of the storage medium. In a second step, the time intervals between the timing marks detectable by the read head are determined from prior step interval data as will be discussed in more detail below. Specifically, the write delays between the detectable timing marks and the desired writing locations for additional marks are calculated via methods as will be discussed below. Next, additional timing marks are written at essentially the same circumferential positions during additional disk revolutions using these delays. This feature provides significant advantages that are not available in known prior art systems and methods. In a preferred method of the present invention, the step of moving and the step of calculating delays and writing are repeated until the servopattern is written on an entire surface of the storage medium.

While FIGS. 1, 2, and 3, show an exemplary disk drive system and related timing control and measurement hardware for use with preferred embodiments of the present invention, other types of rotatable media drives can also be used (e.g., drives having only one recordable disk or only one recording head) within the scope of the present invention. Although the discussion of preferred embodiments is illustrated with examples of magnetic media hard disk drive systems, other embodiments of the present invention may alternatively include nonmagnetic rotatable media or a combination of magnetic and nonmagnetic rotatable media within the scope of the present invention.

According to the preferred embodiments of the present invention, when the head is positioned so that the write element writes servodata at a given radial location, the read element passes over servodata that was previously written at a different radial location. The servodata is sequentially written at each radial position, so the read element normally is displaced from the write element in a direction that is opposite to the direction of servo-track writing propagation. According to the preferred embodiment, referring to FIG. 6, the read element 51 is positioned at the radius 590 so it reads (detects the time of passage of) a detected timing mark 500 and then after a calculated write delay, as will discussed in detail below, writes a timing mark extension 570. As the disk continues to rotate the head reads the timing mark 501 and then after a calculated write delay writes a timing mark extension 571. The process is repeated for a full rotation. The read head is moved to the next radial location 591 and the process is continued until a set of timing marks are written across a disk surface.

Definition of Stored Locations of Timing Marks

In the preferred embodiment, we will define a location array M[i] which stores the location of the detected "i"th timing mark defined in terms of the measured detected intervals, IM[i] measured during the rotation while writing of new timing marks at radial step S, defined iteratively as $M[0]=IM[0]-A$; and $M[i+1]=IM[i+1]A+M[i]$.

The parameter A is the average timing mark spacing, either for the most recent revolution (the previous rotation period divided by the number of timing marks around the disk, n) or the sum all of the IM[i] divided by the number of timing marks around a rotation or the average timing mark spacing plus an estimated speed error at the current timing mark (see for example, U.S. Pat. No. 6,078,450 which is commonly owned by the assignee of the present patent application and the entire teachings of which are hereby incorporated by reference.) As defined M[i] is a measure of the deviation of a detected timing mark from its nominal position.

In the preferred embodiment, we will define a location array L[S,i] which stores an estimated location of the just written "i"th timing mark at radial step S, defined as $$L[S,i]=M[i]+D[i]-C.$$

The index S is incremented after each radial step. In the preferred embodiment, to reduce the size of the data array, we can use modulo N2+1 arithmetic for the index S. While not shown explicitly, modulo arithmetic is implied for S everywhere. Also, modulo arithmetic is implied for the interval indexes. The parameter C is the systematic delay correction term.

In an alternative embodiment the stored data can include a component of the current estimated detected timing mark locations, LC[i]. Formula's for LC[i] will be described in the next section. In the alternative embodiment $$L[S,i]=P*(M[i]+D[i]-C)+(1-P)*LC[i]$$

with the value of P between 0 and 1.

Calculation of Detected Timing Mark Estimated Locations and Intervals

As the read head is positioned over timing marks whose locations were stored earlier during the servowriting process, the stored values are retrieved and estimated intervals between stored locations are calculated. A weighted average of several stored locations at that circumferential position can be used also here.

There are several ways of calculating LC[i], including the following:

1. A function (weighted average based on the offset or a fixed weight, or some other function) of one or more of the prior stored locations L[S,i] to be described below.
2. A function of the intervals between timing marks during the writing revolution and/or prior revolutions. A preferred function sums the intervals between trigger marks and timing mark write locations from the start of the revolution to each timing mark and scales the result so that the sum over the complete revolution is equal to the rotation time.
3. A function (weighted average or other) of cases 1 and 2 above.

A preferred embodiment preferably uses case two above, using only data from the revolution where the writing is done.

When an offset head is positioned radially to write extensions to the timing marks and servo pattern the read head may be positioned to straddle timing marks created by one or more previous write operations. As a result the best estimate of where the detected timing mark is located may be a mixture of estimated locations for timing marks written at several previous radial locations, for example the read head may be positioned so that 50% of it falls over the timing mark written at step 100 and remainder falls over a timing mark written at step 101, in this case the best estimate of the timing mark location s, may be LC[i]=0.5*L[100,i]+ 0.5*L[101,i]. If the head straddles timing marks written at three or more locations the estimate can be a function of multiple stored data sets, as in LC[i]=sum j from 0 to k of F(j) *L[100−j,i], where k is the number of marks straddled by the read head. In an alternative embodiment, the only the two timing marks with the largest overlap are used. In addition, it may be desirable to mix estimated locations with weighted averages to improve the propagation stability, in this case the weighting factor can be a different function of the head offset.

Specific Embodiment Calculation of LC[s] and Derivation of Estimated Intervals and Write Delays According to a preferred embodiment of the present invention:

$$LC[i]=f1*L[S-N1,i]+f2*L[S-N2,i]$$

and f1=F1 and f2=F2, thus the location of the detectable timing mark is assumed to be the weighted average of the stored estimates L[S−N1,i], L[S−N2,i], with the weighting being determined by the relative fractions of the read head falling over the portions of the timing mark line written N1 and N2 steps back.

In an alternative embodiment, the relative weights f1 and f2 are a different function of F1 and F2. In one embodiment f1=f2=0.5. In another embodiment, f1 and f2 equal F1 and F2 except that neither is allow to fall below a certain fraction, Eg. if f1 is 0.1 and the minimum is 0.2, f1 is increased to 0.2 and f2=1−f1=0.8. These alternative embodiments can have advantages for propagation stability.

In an alternative embodiment, $$LC[i]=\text{sum } j=1 \text{ to } k\{Fj*L[S-Nj,i]\}$$

where the Fj are a set of k weighting factors applied to a number of stored data sets Nj back in the indexing.

From the current estimated value of LC[i] indicated with just the index "i" calculate the estimated intervals I[i], via the formulae $$I[0]=L[0]-LC[n-1]+A.$$

$$I[i+1]=LC[i+1]-LC[i]+A.$$

The parameter A is the average timing mark spacing, either for the most recent revolution (the previous rotation period divided by the number of timing marks around the disk, n) or the average timing mark spacing plus an estimated speed error at the current timing mark (see for example, U.S. Pat. No. 6,078,450, which is commonly owned by the assignee of the present patent application and the entire teachings of which are hereby incorporated by reference.)

Note that in the math described here, the location arrays are defined for convenience and have an entirely equivalent definition in terms of intervals between timing marks. An interval-based array of stored data is anticipated herein. In the case where every timing mark is written every step, the intervals can be directly substituted for the defined locations. In alternative embodiments we may store and combine estimated time delays instead of, or in combination with, storage of estimated intervals or estimated timing mark locations. A time-delay-based array of stored data is anticipated herein. These embodiments are mathematically equivalent in the absence of nonlinear correction terms. The location array is more convenient than the interval array or time delay array when not all timing marks are written on each rotation where writing takes place.

Initial Values for LC[i]

Preferably values for LC[i] are initially set at the beginning of the process because array L[S,i] starts out empty so that L[S−N2,i] has no value until the process has proceeded for N2 steps.

In one embodiment, the array LC[i] is filled with zero's initially for N2 steps. In another embodiment, as the head is stepped out to write at steps 0, 1, 2, 3 . . . N2 to extend the timing marks and servo data, the intervals between the timing marks of the initial starting pattern are measured during an extra measurement revolution after repositioning the head but prior to the write. LC[i] is then set to $$LC[0]=I[0]-A, LC[i+1]=LC[i]+I[i]-A.$$

Correction Terms Indexed Modulo the Offset

Since the timing of new write at a new radial position is controlled by the time of passage of detected timing marks written at a radial offset behind the currrent write head position, positioning errors in the pattern tend to repeat at intervals of a head offset. More accurate and stable positioning can be obtained by recording accumulated (averaged over multiple instances) information about errors in the pattern in arrays that are indexed by a step number modulo the offset. Examples of correction terms that can be stored this way are the position of the first timing mark after index and the deviation in the position of the first mark as measured by measuring the time of arrival of the timing marks at the beginning and end of a disk revolution where the head is being moved radially, if the time differs from the rotation time, the timing mark position is not the same after the radial translation of the head. Another correction term that can be indexed this way is the average length of each sector.

The typical formats for terms of this nature are $$F[S\%N1]=F[S\%N1]+error$$

where F[S%N1] is the stored value of the correction term, shown indexed by the current step number modulo the offset, being incremented by the error measured on the current step. The notation S%N1 means the step number modulo the integer part of the read-write head offset measured in servo steps. Another format is $$F[S\%N1]=F[S\%N1]+K^*(error-F[S\%N1])$$

forming an exponential average with weight K.

Calculation of Write Delays

As described in prior art, the intervals between the timing marks passing under the read head can be used to calculate write delays D[i] which indicate how long after a timing mark the write should be executed to extend an existing timing mark line optimally.

In this embodiment the delay for writing is sum of the systematic and random error corrections and any corrections indexed relative to the offset:

$$D[i]=C+R[i]+F[S\%N1]$$

In a preferred embodiment F[S%N1]=0.

The delays between the detectable timing marks and the desired writing locations for additional marks are preferably calculated utilizing the estimated intervals between detectable timing marks where interval values are used, for example in calculating the random error correction R[i]. The delay times for writing between a detected timing mark and the timing mark line being extended can be preferably corrected for systematic delays according to the teachings of U.S. patent application Ser. No. 09/550,643 and U.S. patent application Ser. No. 08/882,396 which are commonly owned by the assignee of the present patent application and the entire teachings of which are hereby incorporated by reference. Additionally, in a preferred embodiment, corrections for errors accumulated from previous process steps are introduced according to the teachings of U.S. patent application Ser. No. 09/316,884, U.S. patent application Ser. No. 09/316,882, and U.S. patent application Ser. No. 08/891,122, which are all commonly owned by the assignee of the present patent application and the entire teachings of which are hereby incorporated by reference. Specifically the random error corrections are calculated using the estimated detected timing mark intervals.

Exemplary Process Flow

Figure 8:
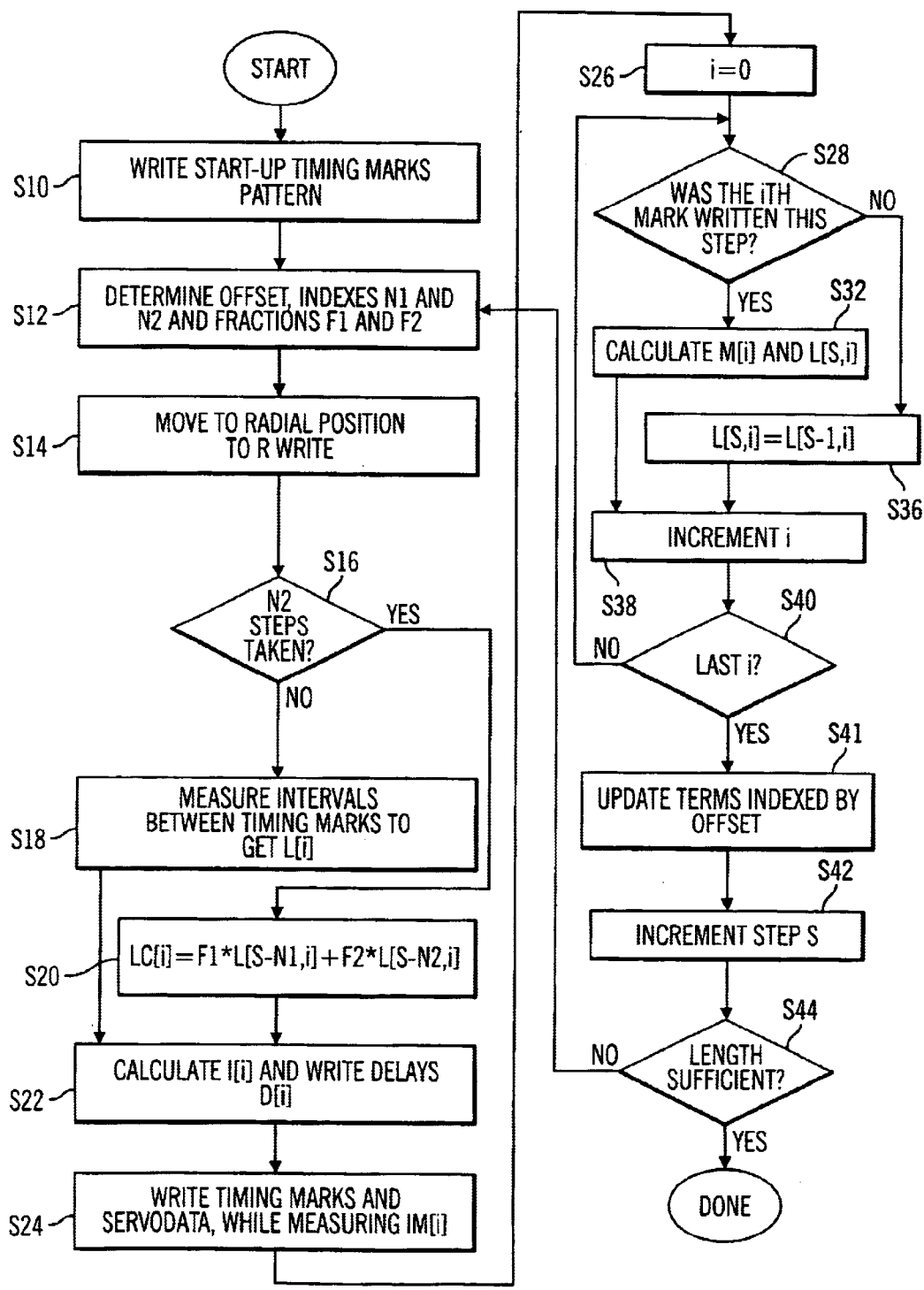
FIG. 8 is an operational flow diagram illustrating an exemplary method for writing timing marks on rotatable storage media, according to the preferred embodiments of the present invention.

FIG. 8 illustrates an overall process flow within which preferred embodiments of the present invention may be practiced. We create, at step S10, an initial set of timing marks by a start up process by a method such as taught in U.S. patent application Ser. No. 09/426,435, the entire teachings of which are hereby incorporated by reference. Thereafter, process steps permit the writing of timing mark extensions based at least in part on calculated delays after detected previously written timing marks, as will be discuss in detail below.

According to a preferred embodiment of the present invention, the passage of each timing mark under the read head is detected and an extension to the line containing that timing mark is written at a calculated interval afterward. The time when a new timing mark extension is written is determined by the passage of a timing mark within the timing mark line being extended. This method is very insensitive to variations in disk rotation speed as the extensions to each timing mark line are directly referenced to a timing mark within the timing mark line.

Exemplary Process Description

FIG. 8 shows an exemplary sequence of operations in servowriting a disk drive, in accordance with the preferred embodiments of the present invention.

1) First, at step S10, we write a startup pattern of timing marks extended by writes at multiple radial locations, such as to form a series of straight lines.
2) Next, at step S12, the index offsets N1 and N2 are calculated as described previously.
3) The head positioned radially to write an additional extension to the timing marks, at step S14.
4) A choice is made, at step S16, until N2 steps have been taken we execute:
   a) The intervals between successive timing marks are measured over an entire revolution, at step S18, and the locations LC[i] are calculated by summing over the intervals via the formulas LC[0]=I[0]−A and LC[i+1]=LC[i]+I[i+1]−A. If additional precision is desired the intervals can be measured again during a second revolution and the each new measurement for an interval averaged with the previous measurement for the same interval.
   b) Otherwise: LC[i] is calculated from the stored data in the array L[S,i], at step S20, via the formula LC[i]=f1*L[S−N1,i]+f2*L[S−N2,i] as described previously.
5) The estimated intervals between timing marks, I[i] are calculated from LC[i] via the formulae I[0]=LC[0]+A; I[i+1]=LC[i+1]−LC[i]+A, at step S22. The write delays D[i] for new timing marks are calculated as described in prior art, using the estimated intervals wherever intervals appear.
6) During a rotation of the disk, the passages of timing marks are recorded and extensions to the timing marks written at the delays D[i] after the passages, at step S24. The intervals IM[i] between successive detected timing marks are noted. Servodata can also be written.

7) A loop over the index "i" is performed over all of the timing mark locations in steps S26 to S40. Start with i=0, at step S26.
8) A choice is made, at step S28, depending on whether a timing mark was written at the "i"th location this step. A timing mark is always written in this embodiment and the first alternative embodiment below but not in the second alternative embodiment described later. If a timing mark is written:
   a) Calculate an estimated location for the newly written timing mark, L[S,i], at step S32 via the formulas described previously. Otherwise:
   b) Carry forward the previous location for this timing mark so that L[S,i]=L[S−1,i], at step S36. Then, increment the index, i (at step S38).
9) Update any corrections that will be indexed by the offset, at step S41, such as the time of arrival of the first timing mark after index, T1. Store this number in a array indexed by the step number modulo the offset: F[S%N1]=F[S%N1]+K*(T1−F[S%N1]). Where K is a weighting factor. The value V*(F[S%N1]−F0), with weighting V can be subtracted as correction term from each write delay at step S to keep the pattern running straight.
10) Repeat step 8 until locations have been entered for all of the timing mark locations, at step S40.

Increment the step count, S (at step S42) and until the full pattern has been written (at step S44), repeat the steps 2 through 9 above.

First Alternative Embodiment (WWR)

Figure 6:
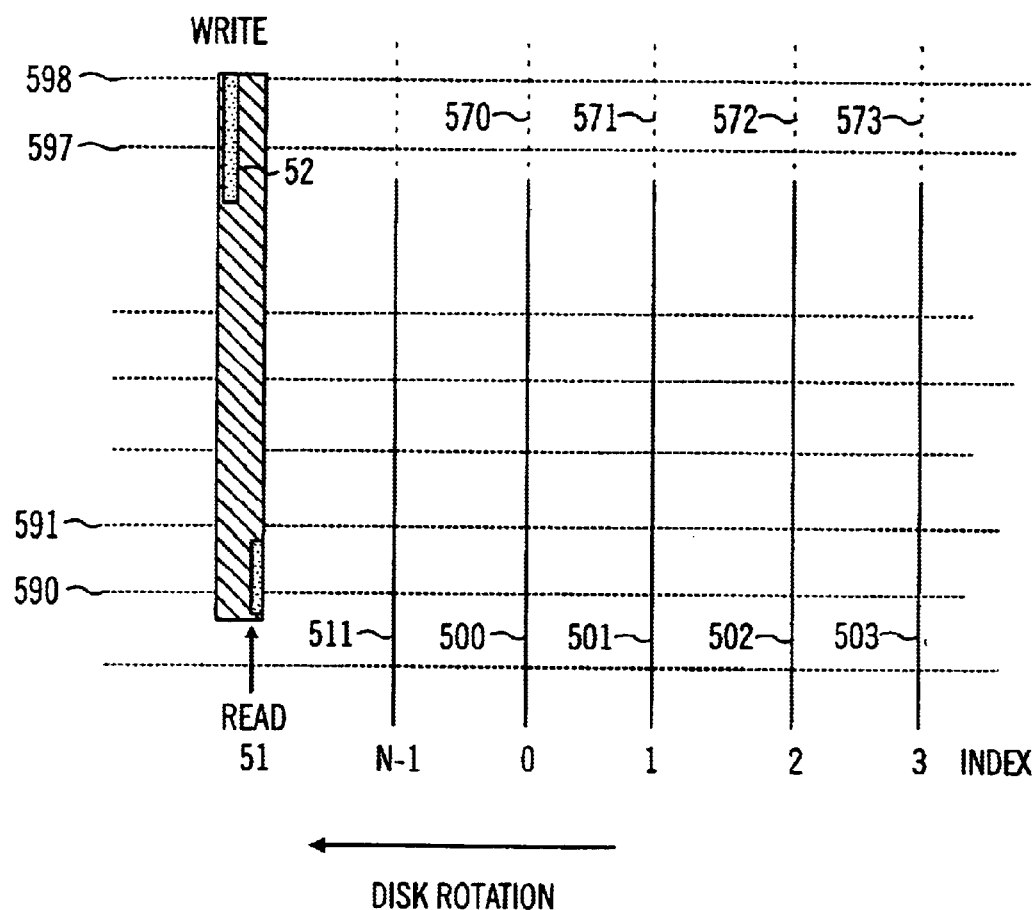

According to another embodiment, referring to FIG. 6, the read element 51 is positioned at the radius 590 so it reads a detected timing mark 511 and then after a calculated delay, as will discussed in detail below, writes a timing mark extension 570. As the disk continues to rotate the head reads the timing mark 500 and then after a calculated delay writes a timing mark extension 571. The process continues until for a full rotation. The read head is moved to the next radial location 591 and the process is continued until a set of timing marks are written across a disk surface. According to the preferred embodiments, the process is performed using timing marker generation and detection hardware such as that described above with reference to FIGS. 1, 2, and 3.

In this embodiment, the delays between the detectable timing marks and the desired writing locations for additional marks are preferably calculated utilizing the estimated time between the previous timing mark and the one being extended. The estimated times between the previous timing mark and the one being calculated can be preferably corrected for systematic delays according to the teachings of U.S. patent application Ser. No. 09/550,643, and U.S. patent application Ser. No. 08/882,396, which are commonly owned by the assignee of the present patent application and the entire teachings of which are hereby incorporated by reference. Additionally, in a preferred embodiment, corrections for errors accumulated from previous process steps are introduced according to the teachings of U.S. patent application Ser. No. 09/316,884, U.S. patent application Ser. No. 09/316,882, and U.S. patent application Ser. No. 08/891,122, which are all commonly owned by the assignee of the present patent application and the entire teachings of which are hereby incorporated by reference.

The stored data and interval estimate formula are the same as in the first preferred embodiment except that the definition of the stored location array is changed to $L[S,i+1]=M[i]+D[i+1]-C;$ $L[S,0]=M[n-1]+D[0]-C.$ with the definitions of M[i], D[i] and C unchanged.

In this embodiment, the delay for writing is the estimated or measured interval between the timing mark from which a delay is measured and the timing mark at the circumferential position to be written, plus the systematic and random error corrections:

$D[i]=I[i]+C-R[i].$

Then, additional timing marks are written at essentially the same circumferential positions during the same disk revolution using these delays. In the preferred method, the step of moving and the step of calculating delays and writing are repeated until the servopattern is written on an entire surface of the storage medium.

In accordance with a preferred embodiment of the invention, we start with timing marks written at a plurality of radial locations at the correct positions, such as to create continuous straight lines of a radial extent larger than the read to write offset. See FIG. 8 for the process flow chart.

Second Alternative Embodiment

Figure 4:
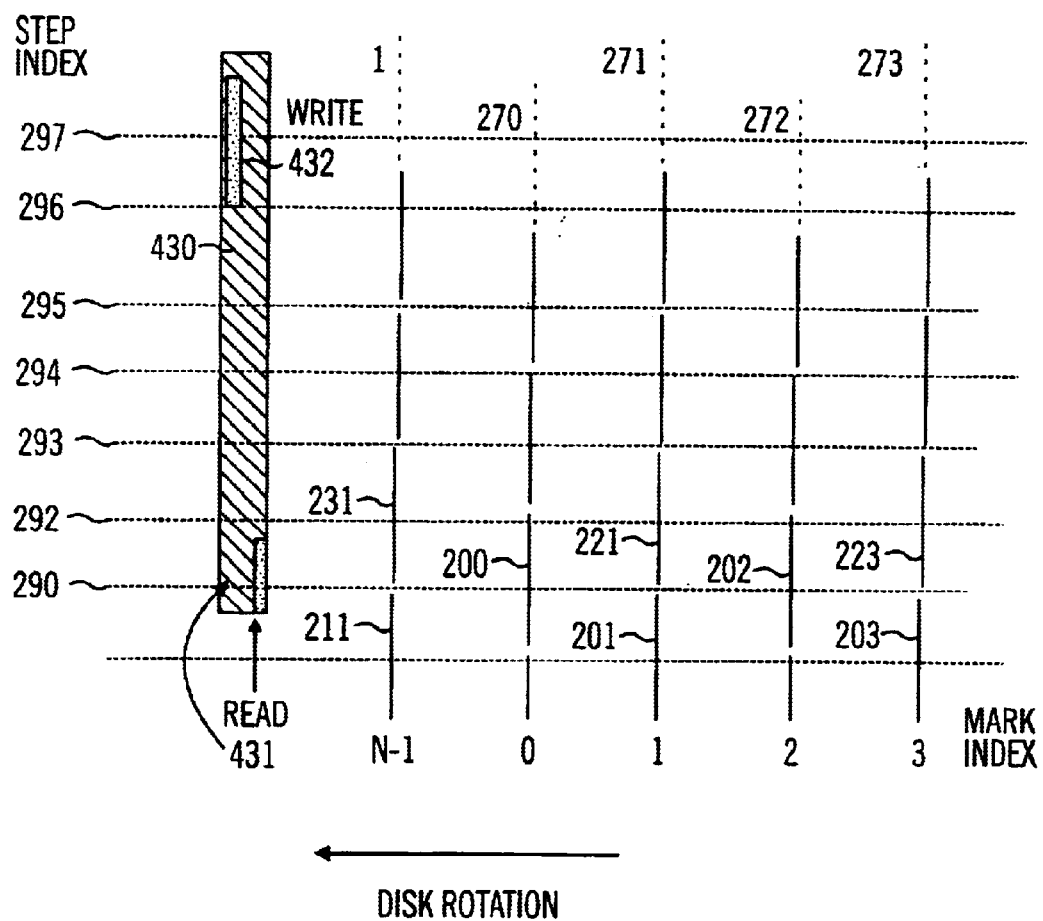
FIGS. 4, 5, 6, and 7, are exemplary top planar views of portions of a disk and exemplary offset read-write element heads being illustrated moving over the disk including timing marks, according to the preferred embodiments of the present invention.
Figure 5:
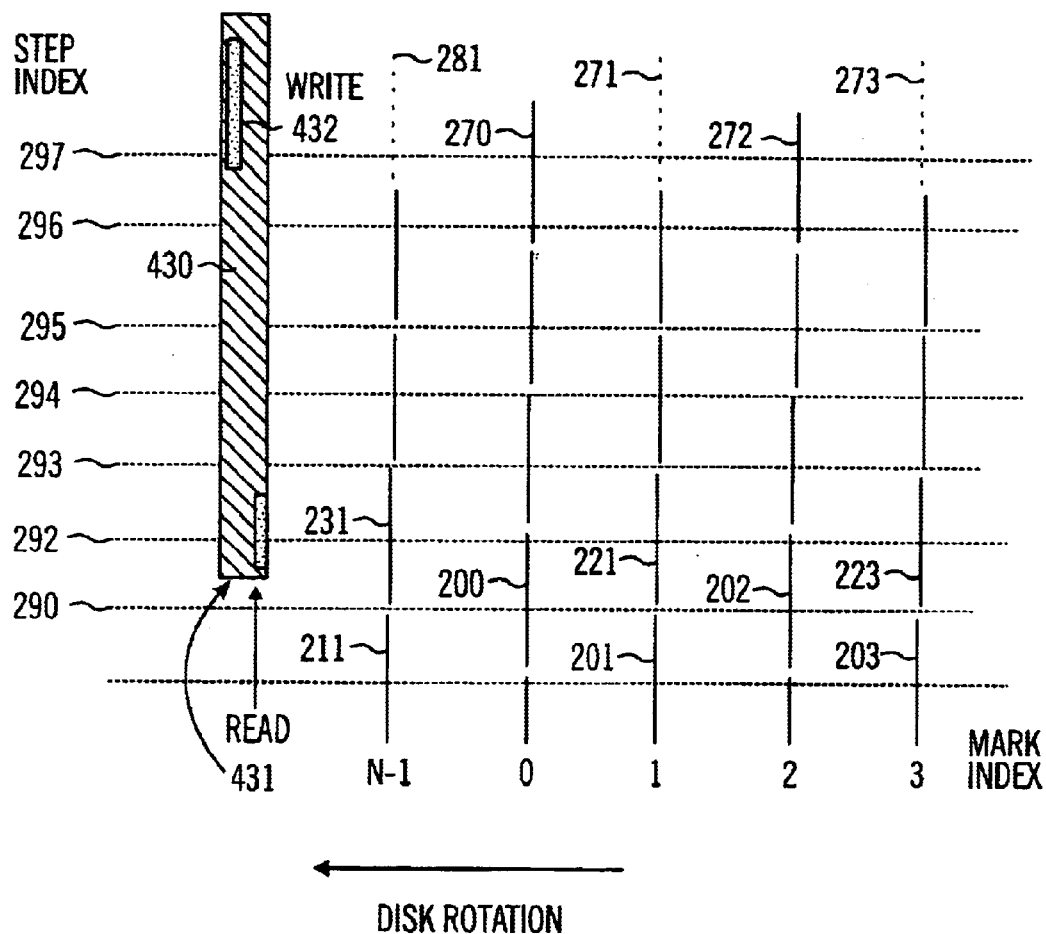

According to another example, referring to FIG. 4, the read element 431 of the head 430 (that is moving across the exemplary radial positions 290, 292, 293, 294, 295, 296, and 297, as shown) may read a timing mark 211 and then after a calculated delay the write element 432 of the head 430 may write a timing mark extension 270. Continuing on at a subsequent radial position (see FIG. 5), the read element 431 of the head 430 may read another timing mark 200 and then after a calculated delay the write element 432 of the head 430 may write another timing mark extension 271. This process may continue until a set of timing marks (e.g., 211, 270, 200, 271, 201, 272, 202, 273, 203, 1, 223, 281, and also 231, 221), is written across a disk surface. According to the preferred embodiments, the process is performed using timing marker generation and detection hardware such as that described above with reference to FIGS. 1, 2, and 3.

In this embodiment the data is stored via the following rules:

A choice is made depending on whether a timing mark was written at the "i"th location this step. If a timing mark is written:
  Calculate an estimated location for the newly written timing mark, $L[S,i]=M[i-1]+D[i]-C.$ otherwise:

Carry forward the previous location for this timing mark so that $L[S,i]=L[S-1,i].$ For this embodiment the write delays take the form $D[i]=I[i]+C+R[i].$ where the random error term is calculated using the estimated intervals as defined earlier.

Realizations

The present invention can be realized in hardware, software, or a combination of hardware and software. A controller in the timing control and measurement system, as illustrated in FIG. 3, and/or in a disk drive system as illustrated in FIGS. 1 and 2, according to the preferred embodiments of the present invention, can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include nonvolatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information. As shown, for example, in FIGS. 1, 2, and 3, and as discussed above, according to the present invention, the timing control and measurement system and the disk drive system, preferably comprise computer systems that include the computers and computer readable medium as discussed above.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for writing timing marks on a rotatable storage medium comprising the steps of:
   calculating a time delay as a function of at least one of the following:
   (a) at least one measured time interval between at least one pair of timing marks, the at least one time interval being measured during at least one previous rotation of the rotatable storage medium followed by writing of at least one timing mark at at least two different radial locations;
   (b) a plurality of measured time intervals between a plurality of pairs of timing marks, the plurality of measured time intervals being measured during a plurality of previous rotations of the rotatable storage medium;
   (c) a plurality of measured time intervals between a plurality of different pairs of timing marks, the plurality of measured time intervals being measured during a plurality of different previous rotations of the rotatable storage medium;
   (d) a plurality of measured time intervals between a plurality of different pairs of timing marks, the plurality of measured time intervals being measured during a plurality of different previous radial rotations of the rotatable storage medium; and
   (e) a weighted average of a plurality of measured time intervals between a plurality of pairs of timing marks, the plurality of measured time intervals being measured during a plurality of previous rotations of the rotatable storage medium;
   storing a representation of the calculated time delay;
   during rotation of a rotatable storage medium, detecting at least a portion of a trigger timing mark; and
   during further rotation of the rotatable storage medium, writing a new timing mark at a location selected based at least in part on the calculated time delay after the detected trigger timing mark.

2. The method of claim 1, wherein the calculated time delay is additionally a function of a first time delay used to write at least one timing mark at a location based at least in part on the first time delay.

3. The method of claim 1, wherein the measurement of time interval between timing marks is performed using a read element of a read-write offset head, and wherein the writing step is performed with a write element of the read-write offset head.

4. A method for writing timing marks on a rotatable storage medium comprising the steps of:
   during a rotation of a rotatable storage medium, detecting the passage of at least a portion of a first timing mark located at a first radius of the rotatable storage medium;
   during a rotation of the rotatable storage medium, detecting the passage of at least a portion of a second timing mark located at a second radius of the rotatable storage medium;
   writing a third timing mark at a third radius of the rotatable storage medium, the location of the third timing mark being based at least in part on a first time delay after the second timing mark;
   during a plurality of rotations of the rotatable storage medium, writing timing marks at a plurality of additional radii of the rotatable storage medium;
   calculating a second time delay as a function of at least one of the first time delay, and
   the time interval between the time of detecting passage of the second timing mark and the time of detecting passage of the first timing mark;
   during a rotation of the rotatable storage medium, detecting the passage of at least a portion of a fourth timing mark located at a fourth radius of the rotatable storage medium; and
   writing a fifth timing mark at a fifth radius of the rotatable storage medium, the location of the fifth timing mark being based at least in part on the second time delay after the fourth timing mark such that the plurality of additional radii are different from and between the third radius and the fifth radius.

5. The method of claim 4, wherein the third and fourth timing marks are the same.

6. The method of claim 4, wherein the third and fourth timing marks are different.

7. The method of claim 4, wherein the detecting steps are performed with a read element of a read-write offset head.

8. The method of claim 4, wherein the writing steps are performed with a write element of a read-write offset head.

9. A method for writing timing marks on a rotatable storage medium comprising the steps of:

during a rotation of a rotatable storage medium, detecting the passage of at least a portion of a first timing mark located at a first radius of the rotatable storage medium;

writing a second timing mark at a second radius of the rotatable storage medium, the location of the second timing mark being based at least in part on a first time delay after the first timing mark;

detecting the passage of at least a portion of a third timing mark located at a third radius of the rotatable storage medium;

writing a fourth timing mark at a fourth radius of the rotatable storage medium, the location of the fourth timing mark being based at least in part on a second time delay after the third timing mark;

calculating a third time delay as a function of the difference in times of writing of the second and fourth timing marks;

during a rotation of a rotatable storage medium, detecting the passage of at least a portion of a fifth timing mark located at a fifth radius of the rotatable storage medium, wherein the fifth radius is such that no part of the first timing mark is detectable during the rotation; and writing a sixth timing mark at a sixth radius of the rotatable storage medium, the location of the sixth timing mark being based at least in part on the third time delay after the fifth timing mark.

10. The method of claim 9, wherein the second and fifth timing marks are the same.

11. The method of claim 9, wherein the second and fifth timing marks are different.

12. The method of claim 9, wherein the detecting steps are performed with a read element of a read-write offset head, and wherein the writing steps are performed with a write element of the read-write offset head.

13. A method for writing timing marks on a rotatable storage medium comprising the steps of:

during a rotation of a rotatable storage medium, detecting the passage of at least a portion of a first timing mark located at a first radius of the rotatable storage medium;

writing a second timing mark at a second radius of the rotatable storage medium, the location of the second timing mark being based at least in part on a first time delay after the first timing mark;

detecting the passage of at least a portion of a third timing mark located at a third radius of the rotatable storage medium;

writing a fourth timing mark at a fourth radius of the rotatable storage medium, the location of the fourth timing mark being based at least in part on a second time delay after the third timing mark;

calculating an estimated interval as a function one or more of: the difference in times of writing of the second and fourth timing marks, the measured difference in time of passage of the first and third timing marks and the first and second time delays;

during a rotation of the rotatable storage medium, detecting the passage of at least a portion of a fifth timing mark located at a fifth radius of the rotatable storage medium, wherein the fifth radius is such that no part of the first timing mark is detectable during the rotation;

calculating a third time delay being based at least in part on the estimated interval; and writing a sixth timing mark at a sixth radius of the rotatable storage medium, the location of the sixth timing mark being based at least in part on the third time delay after the fifth timing mark.

14. The method of claim 13, wherein the second and fifth timing marks are the same.

15. The method of claim 13, wherein the second and fifth timing marks are different.

16. The method of claim 13, wherein the detecting steps are performed with a read element of a read-write offset head, and wherein the writing steps are performed with a write element of the read-write offset head.

17. A method for writing timing marks on a rotatable storage medium comprising the steps of:

during a first rotation of a rotatable storage medium, detecting the passage of at least a portion of a first timing mark located at a first radius of the rotatable storage medium;

detecting the passage of at least a portion of a second timing mark located at a second radius of the rotatable storage medium;

during a second rotation of the rotatable storage medium, detecting the passage of at least a portion of a third timing mark located at a third radius of the rotatable storage medium;

detecting the passage of at least a portion of a fourth timing mark located at a fourth radius of the rotatable storage medium;

calculating an estimated time delay that is a function of a time interval measured between the passage of any pair of the first, second, third, and fourth timing marks; and writing at least one timing mark at at least one radius of the rotatable storage medium, the location of the at least one timing mark being based at least in part on the calculated estimated time interval after detecting the passage of a timing mark on the rotatable storage medium.

18. The method of claim 17, wherein the calculating step comprises the step of calculating an estimated time delay that is a function of both a time interval measured between the passage of the first and second timing marks and a time interval measured between the passage of the third and fourth timing marks.

19. The method of claim 18, further comprising the steps of:

during a rotation of a rotatable storage medium, detecting the passage of at least a portion of a fifth timing mark located at a fifth radius of the rotatable storage medium; and writing a sixth timing mark at a sixth radius of the rotatable storage medium, the location of the sixth timing mark being based at least in part on the calculated estimated time delay after the fifth timing mark.

20. A method for writing timing marks on a rotatable storage medium comprising the steps of:

during a rotation of a rotatable storage medium, detecting the passage of at least a portion of a first timing mark located at a first radius of the rotatable storage medium;

calculating a time delay which is based at least in part on measured time intervals between the detection of a plurality of timing marks the passage of which having been detected during a plurality of rotations of the rotatable storage medium; and writing a second timing mark at a second radius of the rotatable storage medium, the location of the second timing mark being based at least in part on the calculated time delay after the second timing mark.

21. The method of claim 20, wherein:
the calculated time delay is based at least in part on a weighted average of measured time intervals between the detection of a plurality of timing marks the passage of which having been detected during a plurality of rotations of the rotatable storage medium.

22. The method of claim 20, wherein the detecting step is performed with a read element of a read-write offset head, and wherein the writing step is performed with a write element of the read-write offset head.

23. The method of claim 20, further comprising the step of:
storing the calculated time delay.

24. An apparatus comprising:
rotatable storage medium;
a moveable head for reading information from, and writing information to, the rotatable storage medium;
a timing interval measurement system for measuring time intervals between timing marks detected by the moveable head;
a programmable delay generator;
a memory;
a program memory containing computer program instructions;
a controller, electrically coupled to the time interval measurement system, the programmable delay generator, the memory, the program memory, and the moveable head, for writing timing marks on the rotatable storage medium in accordance with computer program instructions in the program memory, the controller following the computer program instructions for the apparatus to perform the following steps:
calculating a time delay as a function of at least one of the following:
(a) at least one measured time interval between at least one pair of timing marks, the at least one time interval being measured during at least one previous rotation of the rotatable storage medium followed by writing of at least one timing mark at at least two different radial locations;
(b) a plurality of measured time intervals between a plurality of pairs of timing marks, the plurality of measured time intervals being measured during a plurality of previous rotations of the rotatable storage medium;
(c) a plurality of measured time intervals between a plurality of different pairs of timing marks, the plurality of measured time intervals being measured during a plurality of different previous rotations of the rotatable storage medium;
(d) a plurality of measured time intervals between a plurality of different pairs of timing marks, the plurality of measured time intervals being measured during a plurality of different previous radial rotations of the rotatable storage medium; and
(e) a weighted average of a plurality of measured time intervals between a plurality of pairs of timing marks, the plurality of measured time intervals being measured during a plurality of previous rotations of the rotatable storage medium;
storing a representation of the calculated time delay;
during rotation of a rotatable storage medium, detecting at least a portion of a trigger timing mark; and
during further rotation of the rotatable storage medium, writing a new timing mark at a location selected based at least in part on the calculated time delay after the detected trigger timing mark.

25. The apparatus of claim 24, wherein the calculated time delay is additionally a function of a first time delay used to write at least one timing mark at a location based at least in part on the first time delay.

26. The apparatus of claim 24, wherein the moveable head comprises a read-write offset head that includes at least one read element and at least one write element, and wherein the measurement of time interval between timing marks is performed using the at least one read element, and wherein the writing of the new timing mark is performed with the at least one write element.

27. A computer readable medium including computer instructions for operating a computer communicatively coupled to a rotatable storage medium drive system, the computer readable medium including computer instructions for:
calculating a time delay as a function of at least one of the following:
(a) at least one measured time interval between at least one pair of timing marks, the at least one time interval being measured during at least one previous rotation of the rotatable storage medium followed by writing of at least one timing mark at at least two different radial locations;
(b) a plurality of measured time intervals between a plurality of pairs of timing marks detected from the rotatable storage medium, the plurality of measured time intervals being measured during a plurality of previous rotations of the rotatable storage medium;
(c) a plurality of measured time intervals between a plurality of different pairs of timing marks detected from the rotatable storage medium, the plurality of measured time intervals being measured during a plurality of different previous rotations of the rotatable storage medium;
(d) a plurality of measured time intervals between a plurality of different pairs of timing marks detected from the rotatable storage medium, the plurality of measured time intervals being measured during a plurality of different previous radial rotations of the rotatable storage medium; and
(e) a weighted average of a plurality of measured time intervals between a plurality of pairs of timing marks detected from the rotatable storage medium, the plurality of measured time intervals being measured during a plurality of previous rotations of the rotatable storage medium;
storing a representation of the calculated time delay;
during rotation of the rotatable storage medium, detecting at least a portion of a trigger timing mark; and
during further rotation of the rotatable storage medium, writing a new timing mark at a location selected based at least in part on the calculated time delay after the detected trigger timing mark.

28. The computer readable medium of claim 27, wherein the calculated time delay is additionally a function of a first time delay used to write at least one timing mark at a location based at least in part on the first time delay.

29. The computer readable medium of claim 27, wherein the measurement of time interval between timing marks is performed using a read element of a read-write offset head, and wherein the writing step is performed with a write element of the read-write offset head.

30. The computer readable medium of claim 27, wherein the rotatable storage medium drive system comprises a hard disk drive system.

31. The computer readable medium of claim 30, wherein the hard disk drive system includes a read-write offset head that includes at least one read element and at least one write element, and wherein the measurement of time interval between timing marks is performed using the at least one read element, and wherein the writing of the new timing mark is performed with the at least one write element.

32. An apparatus comprising:
rotatable storage medium;
a moveable head for reading information from, and writing information to, the rotatable storage medium;
a timing interval measurement system for measuring time intervals between timing marks detected by the moveable head;
a programmable delay generator;
a memory;
a program memory containing computer program instructions; and
a controller, electrically coupled to the time interval measurement system, the programmable delay generator, the memory, the program memory, and the moveable head, for writing timing marks on the rotatable storage medium in accordance with computer program instructions in the program memory, the controller following the computer program instructions for the apparatus to perform the following steps:
calculating a time delay as a function of at least one of the following:
(a) a plurality of measured time intervals between a plurality of pairs of timing marks, the plurality of measured time intervals being measured during a plurality of previous rotations of the rotatable storage medium;
(b) a plurality of measured time intervals between a plurality of different pairs of timing marks, the plurality of measured time intervals being measured during a plurality of different previous rotations of the rotatable storage medium;
(c) a plurality of measured time intervals between a plurality of different pairs of timing marks, the plurality of measured time intervals being measured during a plurality of different previous radial rotations of the rotatable storage medium; and
(d) a weighted average of a plurality of measured time intervals between a plurality of pairs of timing marks, the plurality of measured time intervals being measured during a plurality of previous rotations of the rotatable storage medium;
storing a representation of the calculated time delay;
during rotation of a rotatable storage medium, detecting at least a portion of a trigger timing mark; and
during further rotation of the rotatable storage medium, writing a new timing mark at a location selected based at least in part on the calculated time delay after the detected trigger timing mark.

33. The apparatus of claim 32, wherein the calculated time delay is additionally a function of a first time delay used to write at least one timing mark at a location based at least in part on the first time delay.

* * * * *